United States Patent Office 2,723,186
Patented Nov. 8, 1955

2,723,186

FLOCCULATION OF SOL BY RAW TITANIUM DIOXIDE TO SEPARATE OUT HYDROCHLORIC ACID

Leif Aagaard, Plainfield, N. J., assignor to National Lead Company, New York, N. Y., a corporation of New Jersey No Drawing. Application October 24, 1951,
Serial No. 252,992

2 Claims. (Cl. 23—202)

The present invention relates, in general, to the production of titanium dioxide and, more especially, to an improved method for promoting the formation of rutile from hydrates precipitated from sulphate solutions of titanium.

In the production of titanium base pigments, and, in particular, rutile pigments, the use of sols to hasten the rate of conversion from anatase to rutile pigment is widely practiced and, in general, these sols are suspensions of colloidal titanium compounds containing an occluded acid such as hydrochloric acid.

Sols of this type are added to meta titanic acid prior to calcination usually prior to the bleaching operation to promote the formation of rutile upon subsequent calcination of the bleached material. In carrying forward these operations, the subsequent filtration and washing of the material results in the loss of the hydrochloric acid which, from the standpoint of economy, is highly undesirable. Moreover, hydrochloric acid tends to cause corrosion of the equipment which in turn causes discoloration of the pigment. It is desirable, therefore, to provide a sol from which a substantial portion of the occluded acid has been removed.

Heretofore, the separation of the occluded acid from the sol has been achieved by flocculating the sol with sulphuric acid but, in such instances, the acid filtrate recovered has been a solution consisting of a mixture of hydrochloric acid and sulphuric acid from which the sulphuric acid cannot be separated economically; and because of the presence of sulphuric acid, these solutions cannot be recycled successfully to form sols.

An object of the invention is to provide an improved process for the production of rutile pigment wherein the filtrate of a flocculated rutile promoting sol may be used economically for preparing additional sols.

A still further object of the invention is to provide an improved process for the production of rutile pigment wherein washed sulphate hydrolysates are treated with a rutile promoting sol from which the occluded hydrochloric acid has been freed by flocculation with washed sulphate hydrolysates, and recovered by filtration and washing, the recovered hydrochloric acid being suitable both for neutralizing sodium titanate and for peptizing the residual titanium hydrate in the preparation of additional sol.

These and other objects of the present invention will become apparent from the following description.

In its broadest aspect, the present invention contemplates a cyclic process for treating titanium sulphate hydrolysates with a rutile promoter which has been prepared by treating a rutile promoting sol with a flocculating agent to produce a rutile promoting coagulum and a coagulum-free acid which may be recovered and recycled for preparing additional sol.

In the description of the present invention, the term washed sulphate hydrolysates is used in its currently accepted meaning to denote meta titanic acid or raw titanium dioxide which is used in the production of titanium dioxide pigment.

According to the present embodiment of the invention, the process for treating washed sulphate hydrolysate with a rutile promoter to yield high percentages of rutile during subsequent calcination is characterized by the use of a rutile promoter from which has been recovered a major portion of the occluded acid, such as hydrochloric acid, or other acids which may have a deleterious effect upon the quality of the pigment and upon the equipment used for processing the pigment material. Moreover, the recovery of the acid from the rutile promoter is effected in such manner that the acid may be recovered and recycled for producing additional rutile promoter thereby effecting a substantial economy over processes wherein the acid is lost.

The rutile promoter used in carrying out the process of the instant invention is a rutile promoting coagulum which has been formed from a sol by a flocculating agent which liberates the occluded acid from the sol whereby the freed acid may be recovered by filtration and washing of the residual coagulum.

In general, the sol is of the type prepared from a water suspension of meta titanic acid and an alkali, such as sodium hydroxide. The slurry is washed free of excess sodium sulphate and sodium hydroxide and then treated with sulphuric acid or hydrochloric acid which reacts with the sodium oxide present in the suspension to form sodium sulphate, or sodium chloride, which, in turn, is washed from the remaining product to leave a titanium hydrate residue. This material is then peptized by an acid, such as hydrochloric acid or nitric acid, and heated to form the rutile promoting sol. It will be understood, however, that other types of sols are contemplated within the purview of the invention.

The flocculating agent used for coagulating a rutile promoting sol has the characteristics of freeing the occluded acid from the sol without adversely effecting the rutile promoting quality of the residual coagulum. It has been discovered that a washed sulphate hydrolysate, or meta titanic acid, is a flocculating agent having these required characteristics. Thus, by treating the rutile promoting sol with washed sulphate hydrolysate, the sol is coagulated thereby freeing a major portion of the occluded acid which may be recovered from the residual coagulum by filtration and washing.

The residual coagulum, sometimes referred to as the rutile promoter, has substantially all of the inherent rutile promoting quantities of the original sol and, when added to titanium suphate hydrolysates prior to calcination, serves to successfully promote the production of rutile pigment during subsequent calcination of the bleached hydrolysate, and without deleterious effects upon the color of the pigment or upon the bleaching, washing and calcining apparatus.

The amount of acid recovered from the rutile promoting coagulum is from about 56 to 93% and has been successfully recycled as a peptizing agent in the preparation of additional sol. Preferably, the acid is fortified by fresh concentrated acid when larger amounts of acid are required for peptization than are recovered from the coagulated sol.

Although the flocculation of the rutile promoting sol may be effected by acids other than meta titanic acid, such as, for example, sulphuric acid, the use of sulphuric acid as a flocculating agent is undesirable for the reasons stated above.

In the process of the present invention, a remarkable economy has been effected in the coagulation of washed sulphate hydrolysates by recovering the occluded hydrochloric acid from the coagulate and re-using the recovered hydrochloric acid for producing additional rutile promoting sol.

The following example is presented to explain more

Example

A rutile promoting sol was made as follows:

52.6 parts of 38% hydrochloric acid were added to 417 parts of sodium titanate cake which had been neutralized with hydrochloric acid, washed and then cut to 18% solids with water. The neutralized and washed titanate contained titanium values equal to 100 parts on a titanium dioxide basis. The slurry formed by the peptization of the washed hydrate was heated to boiling in a period of substantially 72 minutes or at a rate of substantially 1° C. per minute to form a sol. After boiling the sol for ten minutes there was substantially 100% conversion of the titanium hydrate from anatase to rutile.

The sol equal to 100 parts titanium values calculated as titanium dioxide was added to 700 parts of washed meta titanic acid (meta hydrate) containing 189 parts of titanium dioxide. The coagulum was deliquored, then washed with 720 parts of water to remove the hydrochloric acid filtrate.

Substantially 1250 parts of hydrochloric acid filtrate were recovered from the flocculated sol, the recovery of hydrochloric acid being substantially 56%. The hydrochloric acid filtrate was then evaporated to substantially 520 parts and fortified with 23 parts of 38% hydrochloric acid. The fortified hydrochloric acid filtrate was then mixed with substantially 420 parts of neutralized and washed sodium titanate cake containing 100 parts titanium dioxide to peptize and form additional sol.

The above deliquored sol or coagulum, containing 100 parts titanium dioxide from the sol and 189 parts from the meta hydrate was then added, prior to the bleaching operation, to a portion of washed sulphate hydrolysate containing 3145 parts titanium dioxide. The bleached hydrolysate was washed and calcined at 900° C. in the presence of 0.23% potassium hydroxide and 0.07% aluminum oxide, and gave a rutile conversion of substantially 95%. The resulting pigment had an exceptionally high tinting strength and good color in oil.

It has been shown by the process of this invention that a rutile promoting sol may be flocculated by meta titanic acid to permit separation of the occluded hydrochloric acid from the sol whereby the hydrochloric acid may be recovered and recycled for use as a peptizing agent in the production of additional sol; and that the residual coagulum may be successfully used as a rutile promoter for washed sulphate hydrolysates at bleach to insure a high degree of rutile conversion upon subsequent calcination of the bleached and washed hydrolysate.

The process thereby effects a remarkable economy in the use of hydrochloric acid and also eliminates the deleterious effects which occluded hydrochloric acid has had on the apparatus for processing the pigment.

While the invention has been described and illustrated by the example shown, it is not intended to be strictly limited thereto and other modifications and variations may be employed within the scope of the following claims.

I claim:

1. A cyclic process for treating meta titanic acid to promote the formation of rutile pigment which comprises forming a rutile promoting sol by treating a neutralized slurry of sodium titanate with a hydrochloric acid filtrate to form a rutile promoting sol containing hydrochloric acid, flocculating said rutile promoting sol with a meta titanic acid to remove the hydrochloric acid therefrom and form a coagulum substantially free of hydrochloric acid and a coagulum-free hydrochloric acid filtrate, separating the coagulum-free hydrochloric acid filtrate from the acid-freed coagulum, admixing the acid-freed coagulum with additional meta titanic acid and calcining the mixture at a temperature sufficient to promote the formation of rutile pigment and recycling the coagulum-free hydrochloric acid filtrate to produce additional rutile promoting sol.

2. In a process for preparing a rutile pigment by adding a hydrochloric acid-free rutile promoting coagulum to metatanic acid prior to calcination and then calcining the admixture, the improvement comprising: preparing a hydrochloric acid-free rutile promoting coagulum by adding metatitanic acid to a rutile promoting sol prepared by treating a sodium titanate slurry with hydrochloric acid, thereby to flocculate the titanium values, and then separating the flocculated titanium values from the hydrochloric acid to produce a hydrochloric acid-free rutile promoting coagulum and a filtrate consisting of hydrochloric acid only.

References Cited in the file of this patent

UNITED STATES PATENTS

| | | |
|---|---|---|
| 1,773,727 | Farup | Aug. 26, 1930 |
| 2,331,496 | Olson | Oct. 12, 1943 |
| 2,441,856 | Turner | May 18, 1948 |
| 2,448,755 | Aagaard | Nov. 22, 1949 |
| 2,494,492 | Ross et al. | Jan. 10, 1950 |
| 2,507,729 | McKinney | May 16, 1950 |
| 2,589,964 | Richmond et al. | Mar. 18, 1952 |